TRANSMITTER FOR SIGNAL TRANSMISSION BY PULSE CODE MODULATION

Filed May 31, 1962 3 Sheets-Sheet 1

INVENTOR
JOHAN C. BALDER
EELTJE DE BOER
CORNELIS M. HART
CORNELIS KRAMER
BY Frank R. Trifari
AGENT

TRANSMITTER FOR SIGNAL TRANSMISSION BY PULSE CODE MODULATION

Filed May 31, 1962

INVENTOR
JOHAN C. BALDER
EELTJE DE BOER
CORNELIS KRAMER
CORNELIS M. HART
BY
AGENT

TRANSMITTER FOR SIGNAL TRANSMISSION BY PULSE CODE MODULATION

Filed May 31, 1962 3 Sheets-Sheet 3

INVENTOR
JOHAN C. BALDER
EELTJE DE BOER
CORNELIS M. HART
CORNELIS KRAMER
BY
Frank R. Jifaris
AGENT 3,267,391

TRANSMITTER FOR SIGNAL TRANSMISSION BY PULSE CODE MODULATION

Johan Cornelis Balder, Eeltje de Boer, Cornelis Maria Hart, and Cornelis Kramer, Emmasingel, Eindhoven, Netherlands, assignors to North American Philips Company, Inc., New York, N.Y., a corporation of Delaware Filed May 31, 1962, Ser. No. 198,819
Claims priority, application Netherlands, July 3, 1961, 266,632; Mar. 27, 1962, 276,489
15 Claims. (Cl. 332—11)

The invention relates to a transmitter for signal transmission by pulse code modulation. This transmitter is provided with a pulse code modulator, connected to a control-signal source formed by a control-pulse generator. The output pulses of the modulator are transmitted and are also applied to a comparison circuit including a signal-frequency integrating network for producing a comparison signal. The comparison signal and the signal to be transmitted are both applied to the pulse code modulator in order to obtain a difference signal which controls the pulse code modulator.

This pulse code modulation method is known under the name of delta modulation method. It is described, for example, in Belgian patent specification No. 489,207.

The invention has for its object to provide a different structure of a transmitter of the above kind, in which not only an excellent transmission quality but also an appreciable simplification of the construction are obtained. The transmitter of the invention may also be used with very high pulse frequencies.

The device according to the invention is characterized in that the pulse code modulator is provided with two two-terminal elements, the asymmetric current-voltage characteristic curves of which exhibit a negative value when a critical value of the control-signal is exceeded. The difference signal is fed to opposite electrodes of the two-terminal elements. The circuit connected to the opposite electrodes of the two-terminal elements furnishes the output pulses of the pulse code modulator. The control-signal source is connected to opposite electrodes of the two-terminal elements in order to supply control-pulses of opposite phases to these electrodes of both two-terminal elements at the same time. The control-pulses periodically shift the bias of both two-terminal elements towards the negative resistance regions of their characteristics.

In the device according to the invention, two-terminal elements which exhibit a negative resistance characteristic curve when exceeding a given critical voltage value, as well as two-terminal elements exhibiting a negative resistance value when exceeding a given critical current value may be employed. An example of two-terminal elements of the first-mentioned kind is a so-called tunnel diode, which, as is known, is formed by a pn-diode having a narrow transition range and p- and n-zones with a comparatively high degree of impurities. An example of the elements of the second kind is a pnpn-diode.

According to a further embodiment of the invention the transmitting device described above may be employed for high pulse frequencies, for example for the transmission of television signals, and may be further simplified by using two-terminal elements, which exhibit a negative resistance value when a critical voltage value is exceeded, since the comparison circuit connected to the junction of the two dipole elements is formed by an integrating network formed by a two-terminal network, comprising the series combination of a series resistor and an integrating coil.

The invention and its advantages will now be described more fully with reference to the figures.

FIG. 1 shows a transmitting device according to the invention.

FIGS. 2*a* and 2*b* and 3*a* and 3*b* show time diagrams and current-voltage characteristic curves respectively for explaining the device according to the invention.

Figure 1:
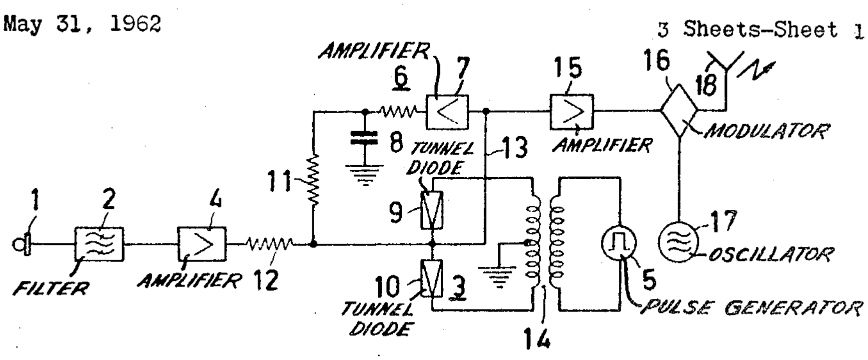

Referring now to FIG. 1, therein is shown a pulse code modulation transmitter according to the invention, that is suitable for the transmission of speech signals in the range of, for example, 300 to 3400 c./s. Speech signals from a microphone 1 are applied by way of a speech filter 2 to a low-frequency amplifier 4 for further handling in a pulse code modulator 3. A control-pulse generator 5 is connected to the pulse code modulator 3. Generator 5 supplies, for example, equidistant pulses having a repetition frequency of 80 kc./s. The output pulses of the pulse code modulator 3 are transmitted and these output pulses are also applied to a comparison circuit 6 including an amplifier 7, serving as a phase-inverting stage, followed by a signal-frequency integrating network, composed of resistors and capacitors, and having, for example, a time constant of 10 milliseconds. A comparison signal is produced in the comparison circuit 6, and this comparison signal and the speech signal to be transmitted, are both applied to the pulse code modulator 3 in order to obtain a difference signal for controlling the pulse code modulator. If desired, the signal-frequencies integrating network may be constructed as described in Belgian patent specification 502,163.

Figure 3:
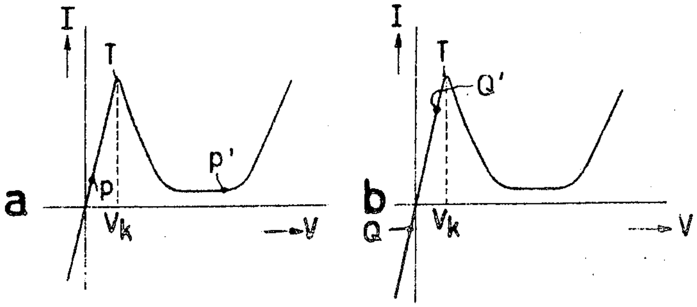

In order to provide a particularly simple pulse code modulator with excellent reproduction quality, the pulse code modulator comprises a pair of two-terminal elements, such as two tunnel diodes 9, 10. These diodes, as will be evident from the current-voltage characteristic curves of FIG. 3, exhibit a negative resistance value, when a given critical voltage value is exceeded. One pair of opposite polarity electrodes of these tunnel diodes 9, 10 are connected together. The comparison circuit 6 and the low-frequency amplifier 4 are connected to the junction of the diodes by way of resistors 11 and 12 respectively. The output pulses of the pulse code modulator 3 are obtained from this junction by way of conductor 13. The control-pulses from the control-pulse generator 5 are simultaneously applied by way of a push-pull transformer 14 having a ground-connected central tapping to the other electrodes of the tunnel diodes 9, 10, due to which the biases of the two tunnel diodes 9, 10 are shifted towards their negative resistance values upon the occurrence of each control pulse.

In the device described above a current is fed to the two tunnel diodes 9, 10 by way of each of the resistors 11, 12. In accordance with the polarity of the difference between the two currents flowing through the resistors 11, 12 (hereinafter termed adjusting current), either the tunnel diode 9 is biased in the pass direction and the tunnel diode 10 in the reverse direction or the tunnel diode 10 is biased in the pass direction and the tunnel diode 9 in the reverse direction. In accordance with the instantaneous value of the comparison voltage at the integrating network 8 which may be higher or lower than the speech voltage at the output of the speech amplifier 4, a positive or a negative adjusting current is produced for the tunnel diodes 9, 10. In response to the polarity of this adjusting current, as will be explained with reference to FIGS. 3*a* and 3*b*, the pulses from the control-pulse generator 5 are applied to the conductor 13 with positive or negative polarity.

At the occurrence of a positive or a negative pulse across the output conductor the charge of the integrating capacitor of the device described will be increased by a given amount or reduced respectively. The emitted pulses may be formed by the pulse sequence of FIG. 2*b*, and in this case the stepwise curve *a* of FIG. 2*a* is obtained, which is a quantized approximation of the speech signal *b* to be transmitted. The pulses indicated in FIG. 2*b* are applied by way of a pulse amplifier 15 including a limiter suppressing the negative pulses to a pulse modulator 16 with the associated carrier-frequency oscillator 17 and are transmitted by way of a transmitting antenna 18.

The operation of the pulse code modulator of FIG. 1 will now be described with reference to the tunnel diode current-voltage characteristic curves of FIGS. 3*a* and 3*b*. FIG. 3*a* shows the current-voltage characteristic curve of the tunnel diode 9 and FIG. 3*b* shows the current-voltage characteristic curve of the tunnel diode 10. From the characteristic curves it will be seen that these tunnel-diode characteristics exhibit a range of negative differential resistance beyond the peak T with a critical voltage value $V_k$.

If at a given instant the tunnel diode 9 is biassed by the adjusting current, for example at point P in the pass direction and the tunnel diode 10 is biassed at point Q in the reverse direction, the control-pulses of opposite phases fed via the transformer 5 to the tunnel diodes 9, 10 will simultaneously shift the bias points P and Q of the two tunnel diodes 9, 10 towards the negative resistance portions of their characteristics. The peak T of the characteristic is first reached by the tunnel diode 9 owing to original bias adjustment P in the pass direction. When the peak of the characteristic curve is pased, the tunnel diode 9 follows its current-voltage characteristic curve towards lower current values. The tunnel diode 10 will be locked at a point in front of the peak T of its characteristic curve. The control-pulses of opposite phases adjust, for example, the tunnel diode 10 at point Q′ of its characteristic curve in front of the peak T and the tunnel diode 9 at point P′ in the flat range of its characteristic curve beyond the peak T. As will be seen from the figure, the resistance of the tunnel diode 10, determined by the quotient of the voltage and current values associated with its adjusting point Q′ is a factor lower than the resistance of the tunnel diode 9 determined by the quotient of the voltage and current values associated with its adjusting point P′. In common the two tunnel diodes 9, 10 constitute a potentiometer across the transformer 14. The negative voltage pulse occurring across the transformer half connected to the tunnel diode 10 is applied to the output conductor 13 by way of the very low resistance of the tunnel diode 10.

Figure 2:
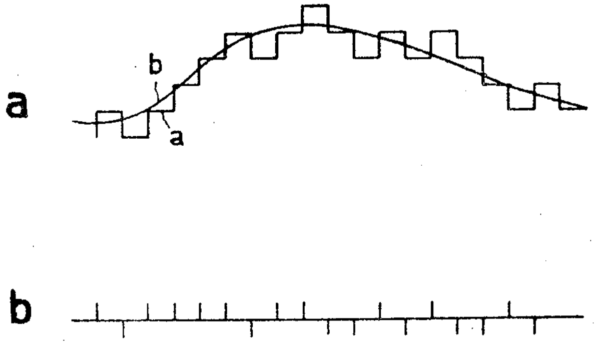

Conversely, if the tunnel diode 10 is biased in the pass direction and the tunnel diode 9 in the reverse direction, the occurrence of the control-pulses of opposite phases will bias the tunnel diode 10 and 9 respectively to adjusting points having a high and a low resistance value, so that in this case a positive voltage pulse is fed to the output conductor 13. When the control-pulses of opposite phases are supplied simultaneously to the two tunnel diodes 9, 10 and according as the speech signal or the comparison signal is higher, a positive or a negative voltage pulse will be fed to the output conductor 13. These voltage pulses produce in the integrating network 8, as is indicated in FIG. 2, a stepwise approximation *a* of the transmitted signal *b*.

For distinguishing the differences between the speech signal and the comparison signal the two tunnel diodes 9, 10 exhibit a very high sensitivity. The two tunnel diodes 9, 10 distinguish even differences of about 2 μa. of the adjusting currents, so that the amplifier 7 in the delta modulation feedback loop and the speech amplifier 4 can be of very simple construction. Apart from the marked simplicity of the construction of the delta-modulation transmiter according to the invention, the excellent transmission quality obtained is surprising. The pulse code modulator 3 described above avoids, particularly, the distortion of the transmitted signals inherent in delta modulation, owing to restrictions of the pulses derived from the pulse code modulator 3, which is due to a change of polarity of the difference signal during the supply of a control-pulse. If the tunnel diodes 9, 10 are adjusted by the control-pulses from the pulse generator 5 to their biasing points of high and low resistance values respectively, this change of polarity during the control-pulse will no longer affect the adjustment of the tunnel diodes 9, 10, so that no distortion will occur in the code pulses derived from the output conductor 13 of the pulse code modulator 3. Apart from the marked simplicity of construction the pulse code modulator described above has an excellent reproduction quality.

Figure 4:
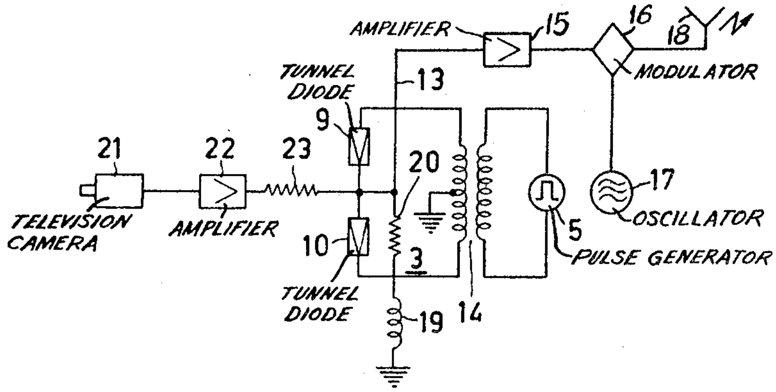
FIG. 4 shows a preferred embodiment of a device according to the invention, which may be used advantageously for very high pulse frequencies.

FIG. 4 shows a preferred embodiment of a device according to the invention, particularly for use with high pulse frequencies, for example for the transmission of television signals, in which a greatly simplified circuit is obtained. Elements corresponding with those of FIG. 1 are designated in FIG. 4 by the same reference numerals.

As is explained with reference to FIG. 1, the pulses derived from the pulse code modulator 3 are applied, in order to produce the comparison signal, by way of an amplifying stage 7, operating as a phase inverter, to an integrating network formed by a quadripole 8. The two functions, i.e. the phase inversion and the integration are carried out in the device shown in FIG. 4 by using a two-pole integrating network formed by the series combination of a resistor 20 and an integration coil 19.

In this device the television signals emanating from a television camera 21, for example lying in the range from 50 c./s. to 5 mc./s. are applied by way of a video amplifier 22 and a series resistor 23 to the junction of the two tunnel diodes 9, 10, which are controlled by the control-pulses of opposite phases from the control-pulse generator 5 having a repetition frequency of, for example, 100 mc./s. The output conductor 13 of the pulse code modulator 3 is also connected to the junction of the tunnel diodes 9 and 10. In addition, the integrating network formed by the series combination of the series resistor 20 and the integrating coil 19, the time constant of which network may be $10^{-2}/\pi$ sec. is also connected to the junction of these diodes.

At each occurrence of an output pulse across the output conductor 13, this code pulse is fed, for integration, by way of the series resistor 20 to the integration coil 19. The electromotive force produced at the integration of the code pulses in the integration coil 19 of opposite sense causes a current to flow towards the tunnel diodes 9, 10, which have just the correct direction for comparison with the signal currents coming in via the series resistor 23. In the manner described with reference to FIG. 1 the tunnel diodes, 9, 10 are thus traversed by an adjusting current. Depending upon whether the polarity of this adjusting current is positive or negative, a positive or a negative output pulse is transmitted to the output conductor 13. The output pulses are applied by way of the pulse amplifier 15 to the pulse modulator stage 16.

The following components were employed in a device extensively tested in practice:

| | | |
|---|---|---|
| Tunnel diodes **9, 10** | | Ge. $I_p$=5 ma. |
| Resistor **20** | ohm | 0.02 |
| Transformation ratio, transformer **14** | | 5:1 |
| Resistor **23** | ohms | 75 |
| Integration coil | μh | 60 |

Figure 6:
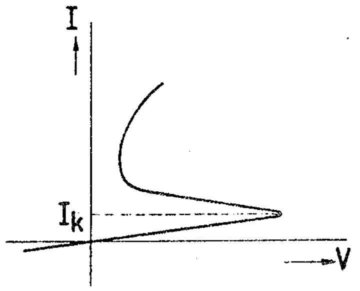
FIG. 6 shows the associated current-voltage characteristic curve.

Two-terminal elements having the current-voltage characteristic curves of the type indicated in FIG. 6 may also be employed in the pulse code modulator according to the invention. Such devices have a dual course as compared with the current-voltage characteristic curve of FIG. 3. With these two-terminal elements, for example pnpn-diodes a negative resistance characteristic curve occurs when a given critical current value $I_k$ is exceeded, which is illustrated in FIG. 6.

Figure 5:
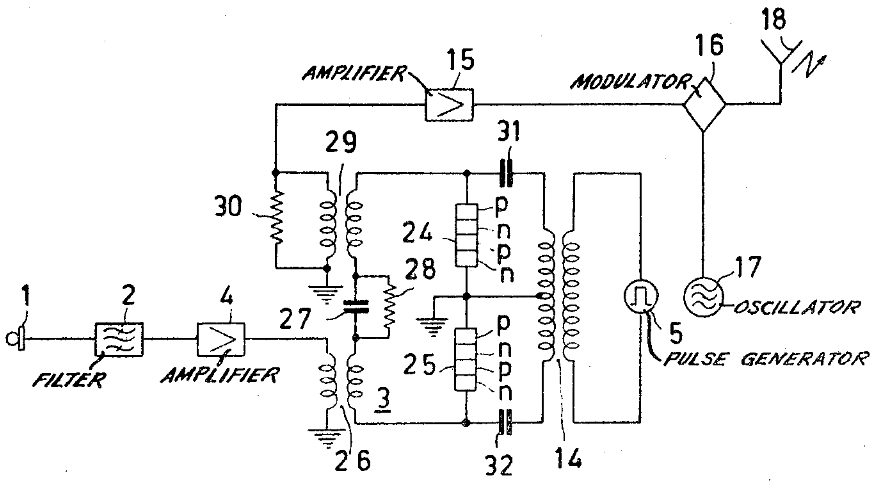
FIG. 5 shows a modification of the transmitting devices shown in FIGS. 1 and 4.

FIG. 5 shows the circuit diagram of a pulse code modulator according to the invention, in which such pnpn-diodes are employed. This circuit diagram is a dual embodiment as compared with the circuit diagram of FIG. 4.

In this device current pulses from a control-pulse generator are applied by way of a push-pull transformer 14 having a ground-connected central tapping to two pnpn-diodes 24, 25. The ends of the secondary transformer winding are connected to opposite electrodes of the pnpn-diodes 24, 25 and the ground-connected central tapping is connected to the junction of the pnpn-diodes 24, 25. The speech voltages from a microphone 1 are applied, subsequent to amplification in a speech amplifier 4, by way of a transformer 26 in phase opposition to the pnpn-diodes 24, 25. An integrating network formed by the parallel combination of a capacitor 27 and a resistor 28 is connected in series with the transformer 26. The code pulses produced in the pulse code modulator 3 are derived from an output transformer 29. Separation capacitors 31, 32 are connected in series with the transformer 14.

The operation of the pulse code modulator described above is similar to the operation of the device described with reference to FIG. 4. The two pnpn-diodes 24, 25 are biassed in opposite senses by the difference voltage between the speech voltage and the comparison voltage occurring across the integrating network 27, 28. Depending upon the polarity of this bias voltage, a positive or a negative current pulse is passed by way of the transformer 29.

By means of a resistor 30, connected in parallel with the secondary winding of the transformer 29, the current pulses derived from the transformer 29 are converted into voltage pulses and fed in the manner described in the foregoing for further processing via the pulse amplifier 15 to the pulse modulator 16, connected to the transmitter aerial 18.

Figure 7:
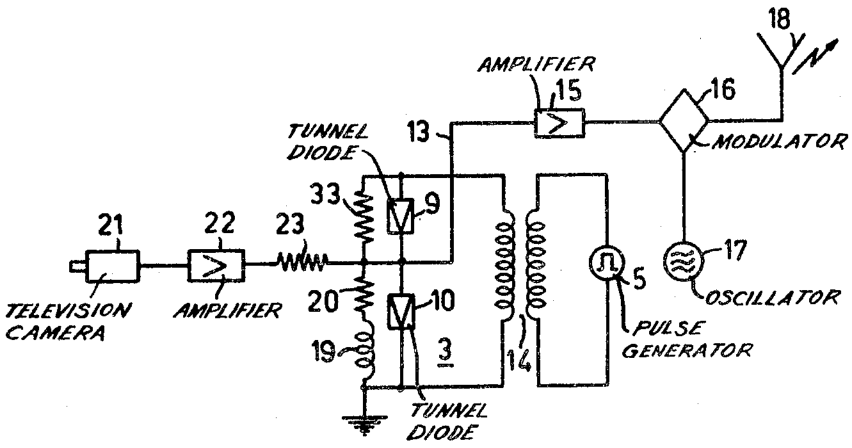
FIG. 7 shows a particularly advantageous modification of the device shown in FIG. 4.

FIG. 7 shows a modification of the device shown in FIG. 4. Corresponding elements are designated by the same reference numerals.

In this device the output pulses of the pulse code modulator are derived from the tunnel-effect diode 10, of which the electrode remote from the junction of the two tunnel-effect diodes 9, 10 is connected to ground.

The operation of this circuit is in principle identical to the operation of the device of FIG. 4. Depending upon the sense of the biasing current, i.e. in accordance with the fact whether the video signal from the video amplifier 22 is higher or lower than the comparison signal, and when a control-pulse is simultaneously fed to the two tunnel-effect diodes 9, 10, which are thus shifted towards the negative resistance characteristic, either the tunnel-effect diode 9 is biased to a high resistance value and the tunnel-effect diode 10 to a low resistance value, or the tunnel-effect diode 9 is biased to a low resistance value and the tunnel-effect diode 10 to a high resistance value.

In this device, in which the output pulses are obtained from the tunnel-effect diode 10, of which the electrode remote from the junction of the two tunnel-effect diodes 9, 10 is connected to ground, the tunnel-effect diode 10 will substantially be at ground potential, when the tunnel-effect diode 10 has a low resistance value and the tunnel-effect diode 9 has a high resistance value. When the tunnel-effect diode 10 has a high resistance value and the tunnel-effect diode 9 has a low resistance value, substantially the full pulse voltage will occur across the tunnel-effect diode 10. Thus pulses of one polarity, directly suitable for transmission are obtained from the tunnel-effect diode 10. The amplitude of these pulses is, in addition, twice that in the device shown in FIG. 4.

The measures described provide not only the transmission-technically important advantages and a simplification in the embodiment, since now a simple transformer 14 will suffice, but also maintain the further advantages of the pulse code modulator shown in FIG. 4 described above. From elaborate experiments it was found that the asymmetry introduced by the measures described into the load of the two tunnel-effect diodes 9, 10 did not markedly act upon the sensitivity and the transmission quality. With the pulse code modulator of the kind described this effect was found to be due to the effect of the comparison circuit 19, 20, which was found to reduce to a high extent, in the manner of a negative feedback circuit, the influence of the asymmetry in the load of the tunnel-effect diodes 9, 10.

Apart from the advantages of extreme simplicity, high sensitivity and excellent transmission quality, the device described above has the advantage of providing pulses of one polarity directly suitable for transmission.

It should be noted that, if desired, the asymmetry in the load of the two tunnel-effect diodes 9, 10 may be reduced in a simple manner by shunting the tunnel-effect diode 9 by a balancing impedance 33, for example a resistor of about 0.1K ohm.

What is claimed is:

1. A delta pulse code modulator comprising a source of input signals, a source of control pulses, a series circuit comprising first and second two-terminal devices that have a symmetric current-voltage characteristics and that exhibit a negative differential resistance region for the same direction of current flow through said series circuit, means applying said control pulses to said series circuit for periodically shifting the bias of said devices toward said negative differential resistance region, output circuit means, biasing circuit means, means connecting said biasing circuit means and output circuit means to said series circuit, and means applying said input signals to said biasing circuit means, said biasing circuit means comprising means for applying opposite polarity biases to said devices equal to the difference between the instantaneous input signals and the integrated signals applied to said output circuit.

2. A delta pulse code modulator circuit comprising a loop circuit of first and second tunnel diodes having opposite polarity terminals connected to a common junction, and a source of control pulses connected between the remaining terminals of said tunnel diodes, said pulses having a polarity tending to drive said tunnel diodes to their negative resistance regions whereby output pulses are produced at said junction, a point of reference potential, means connecting a point on said loop circuit other than said junction to said point of reference potential, a source of input signals connected between said junction and point of reference potential, two-terminal integrating and inverting circuit means connected between said junction and point of reference potential, whereby said tunnel diodes are oppositely biased with a potential that is the difference between the instantaneous signal potential and the inverted and integrated output pulses, and output circuit means connected to said junction.

3. The circuit of claim 2, wherein said integrating and inverting circuit means comprises a resistor and an inductor serially connected between said junction and point of reference potential.

4. The circuit of claim 2, wherein said remaining terminal of one of said tunnel diodes is connected to said point of reference potential.

5. A delta pulse code modulator circuit comprising first and second tunnel diodes having a first pair of opposite polarity terminals connected to a common junction, means connecting the remaining terminal of said first tunnel diode to a point of reference potential, a source of control pulses connected between the remaining terminal of said second tunnel diode and said point, said control pulses having a polarity to drive said tunnel diodes toward the negative resistance regions of their current-voltage characteristics, a source of input signals connected between said junction and said point, a series connected resistor and inductor integrating circuit connected between said junction and said point, and output circuit means connected to said junction.

6. The circuit of claim 5, comprising resistor means connected in parallel with said second tunnel diode.

7. A delta pulse code modulator circuit comprising a loop circuit of first and second tunnel diodes and a source of control pulses, said tunnel diodes having a common junction to which unlike polarity terminals are connected, said pulses having a polarity tending to drive said tunnel diodes into the negative resistance regions of their current-voltage characteristics, means providing a biasing current for said tunnel diodes comprising a source of input signals connected between said junction and another point on said loop circuit, and integrating and inverting circuit means connected between said junction and said point, whereby output pulses occur at said junction upon the occurrence of said control pulses and having a polarity dependent upon the difference between the input signal and the voltage applied to said junction by said integrating and inverting circuit means, and output circuit means connected to said junction.

8. The circuit of claim 7, in which said integrating and inverting circuit means comprises a resistor and an inductor serially connected between said point and junction.

9. The circuit of claim 7, in which said integrating and inverting circuit means comprises phase inverting means, means connecting the input of said phase inverting means to said junction, a series connected resistor and capacitor connected in that order between the output of said phase inverting means and said point, and resistor means connecting the junction of said resistor and capacitor to said junction between said first and second tunnel diodes.

10. A delta pulse code modulator circuit comprising a loop circuit of first and second tunnel diodes and a source of control pulses, said tunnel diodes having a common junction to which unlike polarity terminals are connected, said pulses having a polarity tending to drive said tunnel diodes into the negative resistance regions of their current-voltage characteristics, whereby output pulses are produced at said junction, said source of control pulses comprising pulse generating means, a transformer having a primary winding connected to said pulse generating means, a secondary winding connected between the remaining terminals of said tunnel diodes, and means connecting a point on said secondary winding to a point of reference potential, means providing a biasing current for said tunnel diodes comprising a source of input signals, resistor means connecting said source of input signals between said common junction and said point of reference potential, and integrating and inverting circuit means connected between said junction and said point of reference potential, whereby said tunnel diodes are oppositely biased with a potential that is the difference between the instantaneous signal potential and the inverted and integrated output pulses, and output circuit means connected to said common junction.

11. The circuit of claim 10, in which said point on said secondary winding connected to said point of reference potential is a center tap on said secondary winding.

12. A delta pulse code modulator circuit comprising first and second two-terminal devices that have asymmetric current-voltage characteristics exhibiting a negative differential resistance region, and terminals of opposite polarity, a common junction, means connecting a first terminal of said first device and a first terminal of said second device to said common junction, the first terminals of said first and second devices being of opposite polarity, a source of control pulses, means connecting said source of control pulses between the second terminals of said devices, said control pulses having a polarity tending to drive said devices to their negative differential resistance regions, a source of input signals, signal inverting and integrating circuit means, means applying said input signals to said integrating circuit means to provide biasing current having an amplitude and polarity dependent upon the instantaneous and previous states of said input signal, means applying said biasing current to said first and second two-terminal devices to bias said devices in opposite senses, and output circuit means connected to said means for applying said biasing current.

13. A delta pulse modulator circuit comprising first and second pnpn diodes, means connecting first unlike polarity terminals of said diodes to a common junction, a source of control pulses, means applying said control pulses in push-pull between said junction and the remaining terminals of said diodes, and a series circuit of a source of input signals, integrating and inverting circuit means, and output circuit means connected between said remaining terminals of said diodes.

14. The circuit of claim 13, in which said integrating and inverting circuit means comprises a parallel-connected resistor and capacitor, and said means applying said control pulses comprises a transformer having a primary winding connected to said source of control pulses, a secondary winding, capacitor means for connecting said secondary winding between said remaining terminals, and a center tap on said secondary winding connected to said common junction.

15. A delta pulse code modulator comprising a source of signals, a source of control pulses, a series circuit comprising first and second two-terminal devices that have asymmetric current-voltage characteristics and that exhibit a negative differential resistance region for the same direction of current flow through said series circuit, means connected to said devices for biasing them in opposite directions with respect to their current-voltage characteristics, output circuit means coupled to said means for biasing said devices, means applying said control pulses to said series circuit with a polarity to periodically shift the biases of said devices toward their negative differential resistance regions, whereby for each control pulse an output pulse is applied to said output circuit of a polarity dependent upon the polarity of the bias on said devices, said biasing means comprising means for integrating and inverting said output pulses, and means for applying to said devices a bias equal to the difference between the instantaneous amplitude of said signals and the amplitude of said inverted and integrated output poles.

References Cited by the Examiner

UNITED STATES PATENTS

| | | | |
|---|---|---|---|
| 2,662,113 | 12/1953 | Schouten et al. | 332—11 |
| 3,053,999 | 9/1962 | Baudin | 307—88.5 |
| 3,069,564 | 12/1962 | De Lange | 307—88.5 |
| 3,120,653 | 2/1964 | Miller et al. | 307—88.5 X |
| 3,151,253 | 9/1964 | Habayeb | 307—88.5 |
| 3,201,595 | 8/1965 | Miller | 307—88.5 |

ROY LAKE, *Primary Examiner.*

A. L. BRODY, *Assistant Examiner.*